United States Patent [19]

Blackman

[11] 4,038,022

[45] July 26, 1977

[54] IN-FURNACE RECUPERATOR

[76] Inventor: Calvin C. Blackman, 5419 Park Drive, Vermilion, Ohio 44089

[21] Appl. No.: 585,218

[22] Filed: June 9, 1975

[51] Int. Cl.² .............................. F23D 11/44
[52] U.S. Cl. ............................ 431/166; 431/215
[58] Field of Search ............... 431/11, 215, 161, 164, 431/166

[56] References Cited

U.S. PATENT DOCUMENTS

| 421,325 | 2/1890 | Stern et al. | 431/215 |
| 435,670 | 9/1890 | Stellwag | 431/215 |
| 711,298 | 10/1902 | Dixon | 431/215 |
| 3,243,612 | 3/1966 | Lyezko | 431/215 X |
| 3,285,240 | 11/1966 | Schmidt | 431/215 X |

Primary Examiner—Edward G. Favors
Attorney, Agent, or Firm—William N. Hogg

[57] ABSTRACT

A recuperator which is disposed inside a furnace to utilize the heat in the products of combustion to preheat the air before it is introduced into the burner for combustion is disclosed. The recuperator has means to collect the products of combustion and cause them to flow from the furnace and air conducting means positioned to draw air externally from the furnace for supply to the burner disposed in heat exchange relationship with the collecting means whereby to heat the air within the furnace.

10 Claims, 11 Drawing Figures

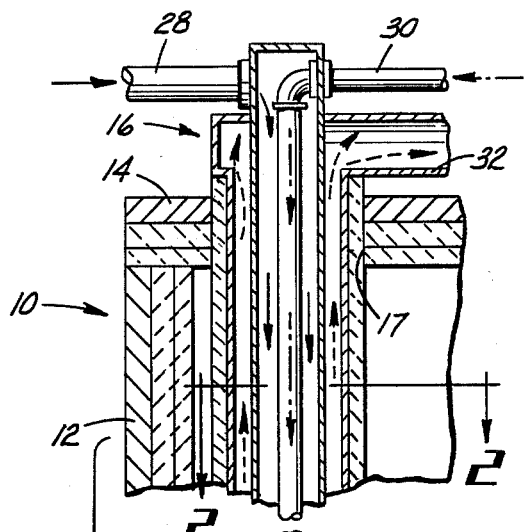
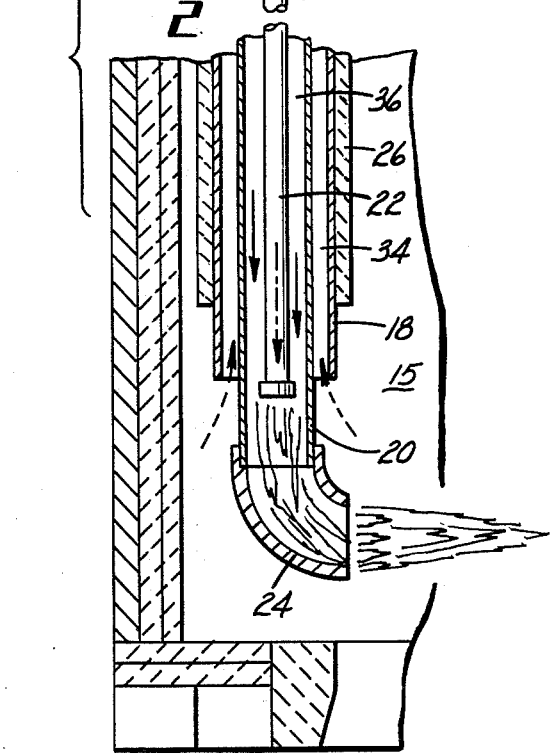
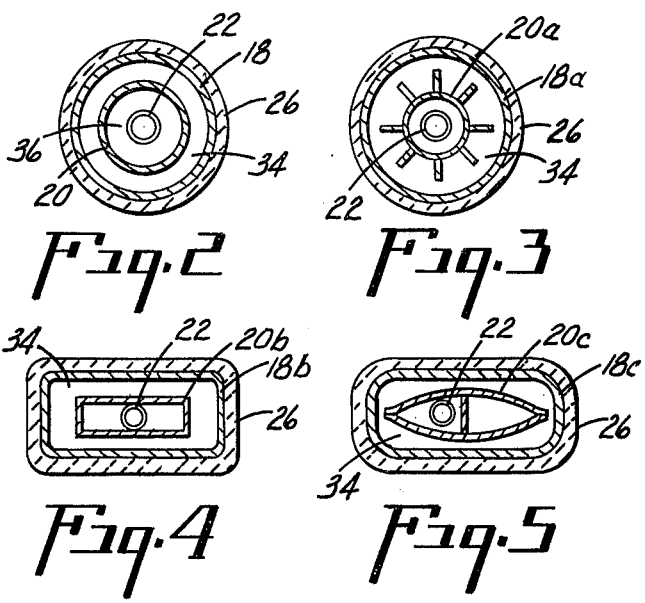
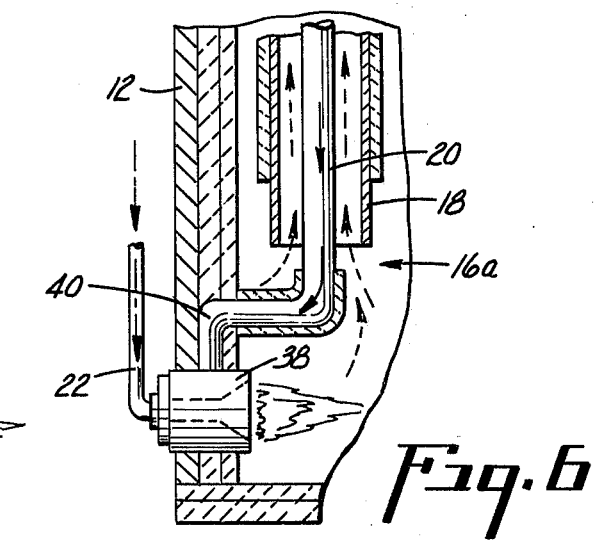
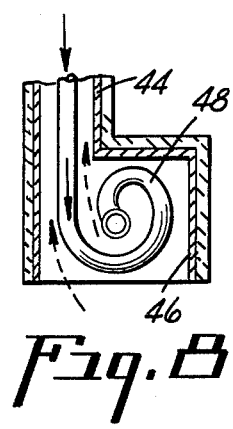
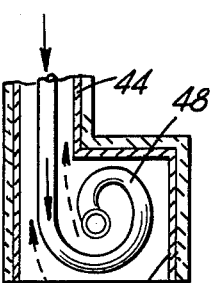

IN-FURNACE RECUPERATOR

BACKGROUND OF THE INVENTION

This invention relates generally to recuperators for furnaces, and more particularly to recuperators that are disposed within a furnace for utilizing the heat in the products of combustion to preheat the air before introducing the air into the burner for combustion.

There have been a few prior art proposals for recuperators for furnaces wherein the heat in the exhaust products of combustion is utilized to preheat the air used for combustion in the burner. However, with the increasing shortage and rising costs of various natural fuels, the desirability of using recuperators is increasing and the importance of such recuperators is increasing substantially.

The recuperators of the prior art have generally been located externally of the furnace and have utilized the exhaust products of combustion after they have been removed from the furnace. This has necessitated rather extensive insulation and also has resulted in structures which are difficult to mount and adequately seal, especially upon heating and cooling, and further, has made it difficult to properly meter the required amount of air to the burner. Thus while recuperators have had some limited success in a few specialized areas, they have not been generally successful in most fields of metallurgical furnaces.

SUMMARY OF THE PRESENT INVENTION

According to the present invention a recuperator for a combustion fired furnace is provided which recuperator is disposed within the confines of the furnace and utilizes the products of combustion to preheat air introduced to the burner, thereby raising the efficiency of the furnace.

DESCRIPTION OF THE DRAWING

FIG. 1 is a vertical sectional view of a portion of a metallurgical furnace utilizing one embodiment of a recuperator according to this invention;

FIG. 2 is a sectional view taken substantially along the plane designated by the line 2—2 of FIG. 1;

FIGS. 3 through 5 are vertical sectional views similar to FIG. 2 showing various configurations of recuperators;

FIG. 6 is a vertical sectional view of a portion of a different embodiment of a recuperator according to this invention ;

FIG. 7 is a vertical sectional view similar to FIG. 6 of still another embodiment of a recuperator according to this invention;

FIG. 8 is a vertical sectional view of a portion of a recuperator of still another configuration according to this invention;

DESCRIPTION OF THE PREFERRED EMBODIMENTS

Figure 9:
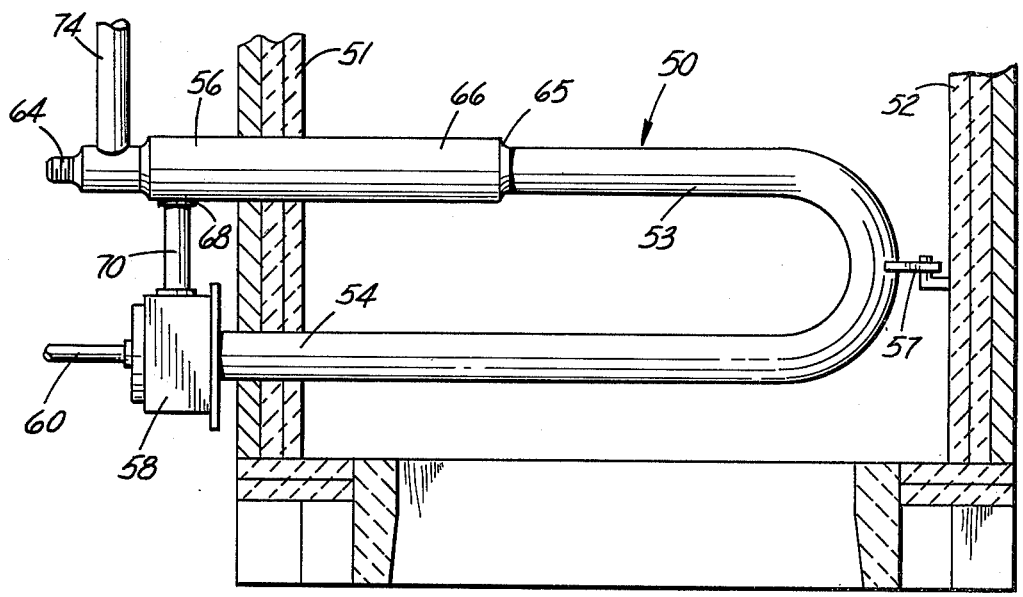
FIG. 9 is a longitudinal sectional view of a portion of a furnace utilizing a recuperator in a radiant tube of the generally U-type configuration.

Referring now to the drawing and for the present to FIGS. 1 and 2, one embodiment of a recuperator according to this invention is shown utilized in a furnace. The furnace is designated generally as 10 and includes an insulated side wall 12 and an insulated top wall portion 14 defined in interior heating chamber 15. The recuperator generally designated as 16 extends through an aperture 17 in the top of the furnace and is disposed within the confines of the furnace 10. (It is to be understood that several of these may be used in a furnace, where several burners are required.)

The recuperator 16 includes an outer exhaust tube 18, and air preheating conduit 20, and a fuel supply tube 22. Secured to the end of the air preheating conduit 20 and the fuel supply tube 22 is a burner 24 which is adapted to mix the fuel and the air and provide the combustion thereof. A layer of insulation 26 is provided which surrounds the outer exhaust tube 18.

A pipe 28 communicates with the air preheating conduit 20 to provide for a supply of air, a gas supply pipe 30 communicates with the fuel supply tube 22 and an offtake conduit 32 communicates with the exhaust tube 18 for removal of the combustion products to the ambient atmosphere.

The recuperator 16 is essentially a heat transfer device for transferring heat from the exhaust products, which are being exhausted from the interior of the furnace 10, to the air which is being supplied to the burner for combustion. Thus the outer exhaust tube 18 defines an exhaust products passage 34 for collecting the exhaust products to utilize their heat and the air preheating conduit 20 provides an intake passage 36 for conducting air for preheating. (Since the device is a heat exchange device it is preferred that the air preheating conduit 20 be made of a high heat conducting material, preferably stainless steel, to promote heat passage therethrough.) As can be seen in FIG. 1 the solid arrows represent the air being taken into the recuperator and flowing through the passage 36 to the burner, the broken arrows represent the exhaust products flowing in a counterflow relationship with respect to the air through the passage 34 out the combustion products exhaust 32, and the dot-dash arrows represent the flow of gas to the burner within the fuel supply pipe 22. The insulation 26 serves to reduce heat loss from the furnace through the tube 18 which would actually reheat the exhaust products, and allows the heat in the exhaust products to be used to preheat the air.

This particuular utilization of a recuperator disposed within the furnace itself has many substantial advantages over recuperators disposed externally of the furnace. First of all, the internal disposition substantially reduces heat losses that are encountered with external recuperators thereby raising the efficiency. Further, once the exhaust products have been utilized they can be exhausted directly to the ambient atmosphere and not through an external structure of the recuperator attached to the furnace. This allows better stability of burner flame wherein the drawing of the air and the exhaust are directly to ambient. Further, it is mechanically much simpler since the recuperators are disposed within the furnace shell itself and an extra supplemental structure is not necessary to be housed or secured to the outside of the furnace. Further, less piping is needed than is required when the recuperator is disposed externally, and also the insulation required inside is minimal as compared to the substantial insulation required when the recuperator is used externally. Additionally, the connections to the furnace are simplified, there being but a single aperture through which the entire recuperator projects and the sealing need only be around the one external tube with there being no problems of differential heating and cooling at sealing areas or interconnected areas of the recuperator. All of this substantially contributes to the greater desirability and efficiency of an internally disposed recuperator.

FIGS. 3, 4 and 5 show cross-sectional configurations of recuperators similar to those shown in FIGS. 1 and 2 but with different cross-sectional configurations of the air preheating conduit and/or the outer exhaust tube. In FIG. 3 the air preheating conduit designated 20a is provided with cooling fins or studs. In FIG. 4 the preheating conduit 20b is rectangular in cross-section, and the outer exhaust tube 18b also is rectangular in cross-section. In FIG. 5 the air preheating conduit 20c is elongated in cross-section generally elliptical with a central web and the outer exhaust tube 18c is oblong in shape. These are to be taken as indication of various configurations, the basic principle, however, being maintained wherein the exhaust tube is disposed within the furnace collecting the products of combustion and allowing them to flow past the air supply conduit in heat transfer relationship therewith while within the furnace which is itself heated.

FIG. 6 shows a recuperator 16a which is a somewhat modified version of that shown in FIGS. 1 and 2. In this figure the burner 38 is disposed within the side wall 12 of the furnace and the recuperator includes an outer exhaust tube 18 and an air preheating conduit 20 therein while the fuel supply tube 22 is disposed externally of the furnace. The principle of operation in this case also is the same; however, the air preheating conduit 20 has an extension portion 40 extending within the side wall 12 connecting with the burner 38 within the wall 12.

The embodiment shown in FIG. 7 is quite similar to that in FIG. 6 except that the extension portion 42 of the air preheating conduit 20 extends through the side wall 12 and connects with the burner 38 externally rather than connecting with the burner 38 within the wall.

FIG. 8 shows a somewhat modified version to increase the heat transfer at the end of the exhaust tube. In this case a modified exhaust tube 44 is provided which has an enlarged end 46 which allows for a spiralled configuration 48 air preheating conduit before it leads to the burner. This provides a greater heat transfer surface at the end of the tube where the gas is the hottest and thereby utilize somewhat more heat at this end and is thus somewhat more efficient in heat transfer.

Figure 10:
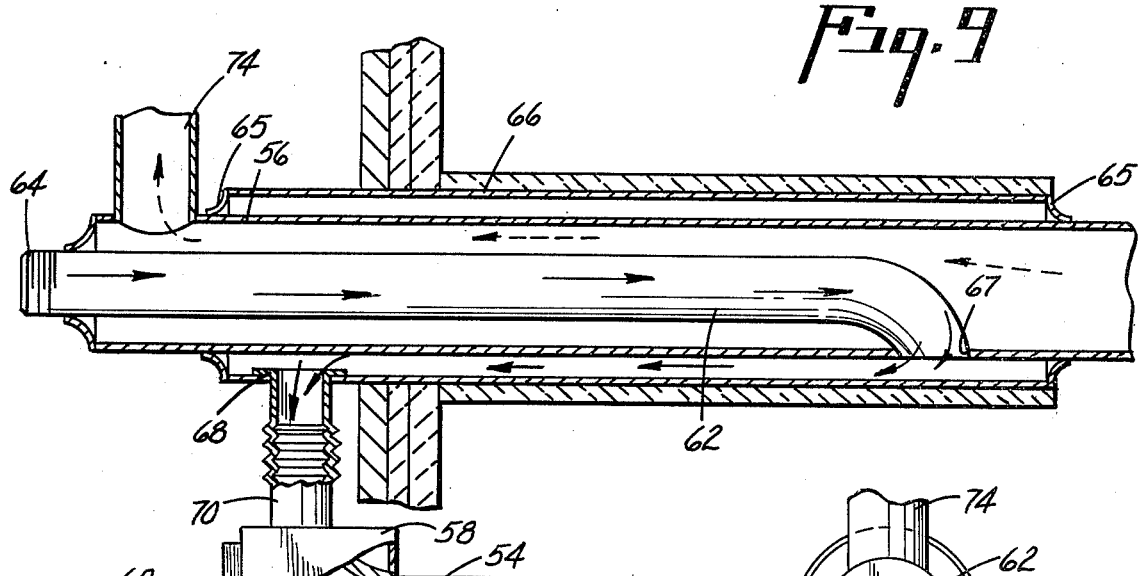
FIG. 10 is an enlarged sectional view of a portion of the tube of FIG. 9 showing various components in detail.
Figure 11:
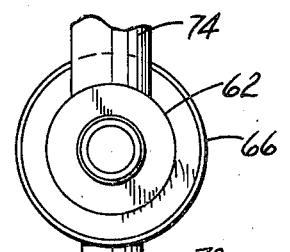
FIG. 11 is a view of the external piping of the air after it has been preheated to the burner from the embodiments as shown in FIGS. 9 and 10.

FIGS. 9 through 11 show a recuperator disposed within a furnace utilizing a "U-shaped" radiant tube construction of heating. The particular radiant tube construction herein is a completely closed system wherein the exhaust products never enter within the enclosure of the furnace but rather heat radiant tubes which tubes then radiate the heat. In this embodiment a radiant tube assembly generally designated 50 is disposed within a furnace extending between a pair of walls which are shown as 51 and 52. The radiant tube assembly 50 has a generally u-shaped radiant tube 53, having a burner portion 54 extending through the wall 51 and an exhaust portion 56 extending through the wall 51 at a location spaced from that where the burner portion extends through. The curved end of the "U" is secured by means of a bracket 57 to the wall 52.

A burner 58 is provided in the burner portion 54 and has a fuel inlet 60 to supply fuel to the burner. Disposed in the exhaust portion 56 of the tube is an internal air pipe 62 with an air supply fitting 64 therefor. Surrounding a portion of the exhaust portion 56 of the u-tube is an exterior conduit 66, sealed by annular end rings 65. The internal pipe 62 is configured to extend through the tube 53 and communicate with the exterior conduit 66 through opening 67 in the radiant tube so that air may flow from the air supply 64 through the interior pipe 62 and thence through the exterior conduit 66 to an air exhaust 68. The air exhaust 68 is connected by an air supply pipe 70 to the burner 58. Thus the air flow from the outside of the furnace part way into the interior of the furnace in the interior pipe 62 which is counter to the flow of the combustion products within the exhaust portion 56 of the radiant tube 50 and thence into the exterior conduit 66 to the air supply pipe 70 and then to the burner. Thus the air is being preheated by a double pass within the furnace, the air being heated as it enters part way through the exhaust portion of the radiant tube and then continues to be preheated as it returns therealong externally of the radiant tube and thence to the burner. The exhaust product from the radiant tube are exhausted through an exhaust opening 74 after they have served their preheating function.

The principle of operation in this a radiant tube wherein the tube is sealed to prevent the escape of exhaust products is similar to that in the previously described embodiments wherein the air is introduced into the furnace and the exhaust products are exited from the furnace for preheating of the air. Thus the recuperation function takes place with the furnace, the air being preheated and then delivered to the burner rather than the exhaust products being delivered to an external structure.

In addition to the advantages mentioned above there are certain additional advantages which occur in this type of a recuperator utilized in conjuction with radiant tubes. First the radiant tubes are readily replaceable and these recuperators can be adapted readily for existing radiant tubes. Efficient recuperation by increased heat transfer also allows utilization of a small space and further provides effective use of the last portion of the radiant tube within the furnace which is often of low effectiveness for heating the work within the furnace. Additionally there is effective utilization of the space within the furnace which otherwise will go to waste and there is no need for hanging exterior fixtures on the furnace. Of curse, the efficiency is greater than external recuperators as explained above.

It should be also kept in mind that various other modifications and designs are applicable, the recuperatos being effectively utilized with O-type and W-type radiant tubes.

What is claimed is:

1. In a furnace having a heating chamber defined by insulated walls and heated by the combustion of a fuel mixed with air delivered from the exterior of the furnace and wherein the air and fuel are supplied to a burner for combustion and the combustion products are exhausted from the furnace, the improvement which comprises,
    a heat recuperator extending beyond the insulated walls disposed within the confines of the furnace heating chamber, said recuperator including collecting means to collect the products of combustion and cause them to flow from the furnace, and air conducting means having an inlet positioned to draw air externally from the furnace and an outlet to supply air to the burner, said air conducting means including heat conducting conduit means disposed in heat exchange relationship with said collecting means, and insulating means surrounding the exterior of said recuperator within the chamber, whereby the heat from the combustion products is utilized to preheat the air before the combustion products are exhausted from the furnace.

2. The invention as defined in claim 1 wherein said collecting mean includes tube to collect the combustion products and the air conducting means is disposed within said tube.

3. The invention as defined in claim 2 wherein said tube is a radiant tube and the burner fires within said radiant tube.

4. The invention as defined in claim 3 wherein the radiant tube is totally enclosed to prevent escape of combustion products into the furnace.

5. The invention as defined in claim 4 wherein the tube has a burner firing portion and an exhaust portion, and wherein the air conducting means is at the exhaust portion.

6. The invention as defined in claim 5 wherein the air conducting means at least in part surrounds the tube means.

7. The invention as defined in claim 5 wherein a portion of the air conducting means surrounds said collection means and a portion of said air conducting means is surrounded by said collection means, and wherein the flow of air is one direction in one portion and the opposite direction in the other.

8. The invention as defined in claim 2 wherein said burner is disposed outside said tube to direct fire the furnace.

9. The invention as defined in claim 1 wherein the recuperator is formed as a unit extending through the furnace wall with the burner mounted thereon.

10. The invention as defined in claim 1 wherein the burner is mounted in a wall of the furnace.

* * * * *